United States Patent [19]

Henderson et al.

[11] Patent Number: 5,405,485
[45] Date of Patent: Apr. 11, 1995

[54] ROBOTIC FIBER OPTIC QUADRUPOLE COIL WINDER

[75] Inventors: James A. Henderson, Moorpark; Joseph A. Sammartano, Chatsworth, both of Calif.

[73] Assignee: Litton Systems, Inc., Beverly Hills, Calif.

[21] Appl. No.: 182,485

[22] Filed: Jan. 14, 1994

[51] Int. Cl.⁶ .................... G01B 9/02; G01C 19/64
[52] U.S. Cl. .................... 156/425; 156/430; 156/431; 156/432; 156/578; 156/361; 356/350; 242/7.09
[58] Field of Search ............... 156/361, 425, 430–432, 156/578; 356/350; 242/7.09

[56] References Cited

U.S. PATENT DOCUMENTS

| | | |
|---|---|---|
| 3,801,029 | 4/1974 | Malberg . |
| 4,310,799 | 1/1982 | Hutchison et al. . |
| 4,419,170 | 12/1983 | Blad ................... 156/361 |
| 4,449,291 | 5/1984 | Rothman . |
| 4,743,115 | 5/1988 | Arditty et al. . |
| 4,781,461 | 11/1988 | Baron et al. ................... 356/350 |
| 4,793,708 | 12/1988 | Bednarz . |
| 4,856,900 | 8/1989 | Ivancevic . |
| 4,928,894 | 5/1990 | Ohno et al. . |
| 5,168,539 | 12/1992 | Negishi et al. . |
| 5,301,884 | 4/1994 | Horneman ................... 242/7.09 |

FOREIGN PATENT DOCUMENTS 61-226609 10/1986 Japan ................... 356/350

OTHER PUBLICATIONS

N. Frigo, "Compensation of Linear Sources of Non-Reciprocity in Sagnac Interferometers", *Fiber Optic and Laser Sensors*, SPIE Proceedings, vol. 142, pp. 268–271, Apr. 5, 1983.

K. Tabe et al., "Drift of an optical fibre gyroscope caused by the Faraday effect and its reduction by use of a polarizing fibre", OPTICA ACTA, vol. 33, No. 12, pp. 1553–1561, 1986.

K. Hotate et al., "Drift of an Optical Fibre Gyroscope Caused by the Faraday Effect: Experiment", *Journal of Lightwave Technology*, IEEE, vol. LT-5, No. 7, pp. 997–1000, Jul., 1987.

*Primary Examiner*—Jeff H. Aftergut
*Attorney, Agent, or Firm*—Lynn & Lynn

[57] ABSTRACT

A payguide mounting bracket assembly is connected to a support stand, and a spool is connected to the payguide mounting bracket assembly to have a fiber optic coil formed thereon. A pair of payguide assemblies are demountably coupled to the payguide mounting bracket assembly. A robotic manipulator assembly is configured to decouple a selected one of the first and second payguide assemblies from the payguide mounting bracket assembly and move the selected payguide assembly to a location adjacent the spool such that a layer of optical fiber is paid out to the spool from the selected payguide assembly as the spool and payguide mounting bracket assembly rotate relative to the selected payguide assembly. The invention also preferably comprises further comprises an epoxy applicator assembly configured to be demountably coupled to the robotic manipulator assembly for movement to a location adjacent the coil for applying epoxy to the coil.

5 Claims, 12 Drawing Sheets

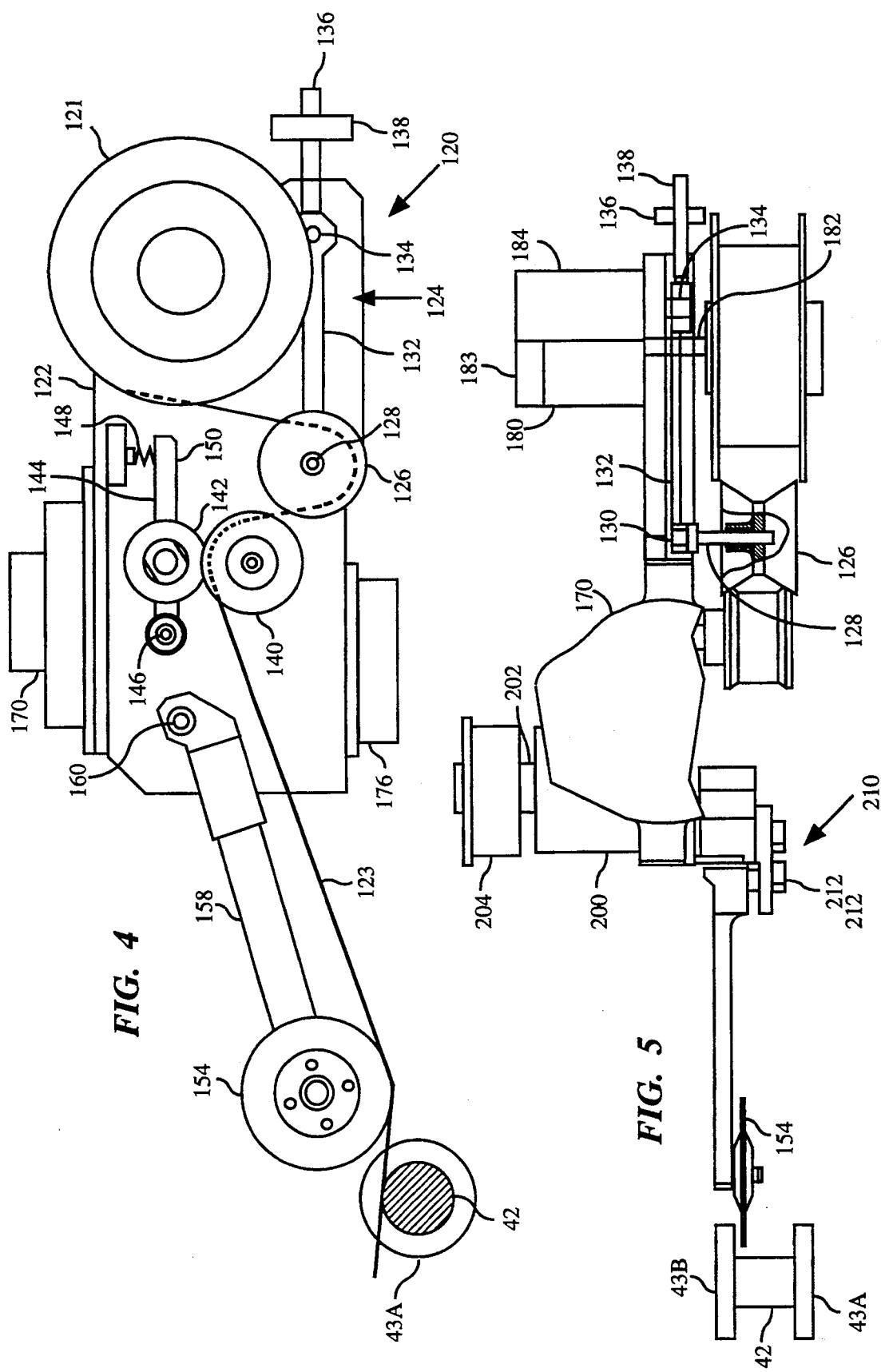

ROBOTIC FIBER OPTIC QUADRUPOLE COIL WINDER

This invention was made with support under contract F33615-90-C-5011 with the United States Air Force. The United States government has certain rights in this invention.

BACKGROUND OF THE INVENTION

This invention relates generally to apparatus and methods for winding coils of optical fiber. This invention relates particularly for forming coils of optical fiber suitable for use in fiber optic rotation sensors. Still more particularly this invention relates to forming a self-supporting a robotic coil winder for forming an optical fiber quadrupole coil with a minimum of manual operations.

It has been found that a fiber optic rotation sensor that meets the performance requirements for guidance and navigation systems should have a sensing coil having quadrupole-wound symmetry. Quadrupole-wound symmetry is attained by dividing a continuous length of optical fiber into two source spools and winding optical fiber from each spool onto a reel. A single layer of the optical fiber coil is first wound on the reel. Then alternating dual layers of optical fiber are wound from each source spool onto the reel. A dual layer is two layers arranged with an outer layer formed over an inner layer such that the wrapping of the outer layer ends where the inner layer begins. The optical fiber is then wound onto the reel until selected equal lengths from each source spool are placed on the reel.

The quadrupole winding pattern preserves symmetry about the center of the fiber and, therefore, decreases phase errors due to changing thermal conditions. Phase errors caused by thermal gradients in fiber optic rotation sensors are discussed by N. J. Frigo, "Compensation of Linear Sources of Non-reciprocity in Signal Interferometers," *SPIE Proceedings, Fiber Optic and Laser Sensors*, Vol. 412, pp. 288–271(Apr. 5, 1983).

The basic structure of fiber optic coils having quadrupole-wound symmetry is explained in U.S. Pat. No. 4,856,900, which issued Aug. 15, 1989 to Ivancevic and which is assigned to Litton Systems, Inc. The disclosure of U.S. Pat. No. 4,856,900 is hereby incorporated by reference into the present disclosure.

A coil formed with quadrupole-wound symmetry has the property that lengths of the fiber which are equidistant from the center of the spool are in such close proximity that they will have essentially the same temperature. Therefore, temperature gradients are symmetrical about the center of the quadrupole-wound coil. Phase errors due to the Shupe effect are, therefore, also symmetrical such that Shupe effect phase errors on opposite sides of the center of the coil are of opposite sign and tend to negate each other.

SUMMARY OF THE INVENTION

A coil winder according to the present invention includes a support stand and a payguide mounting bracket assembly connected to the support stand. A spool is connected to the payguide mounting bracket assembly to have a fiber optic coil formed thereon. A motor is connected to the payguide mounting bracket assembly and configured for rotating the payguide mounting bracket assembly and the spool. A first payguide assembly is demountably coupled to the payguide mounting bracket assembly. A first payguide assembly is demountably coupled to the payguide mounting bracket assembly. A robotic manipulator assembly is configured to decouple a selected one of the first and second payguide assemblies from the payguide mounting bracket assembly and move the selected payguide assembly to a location adjacent the spool such that a layer of optical fiber is paid out to the spool from the selected payguide assembly as the spool and payguide mounting bracket assembly rotate relative to the selected payguide assembly.

The apparatus according to the present invention preferably is formed such that each of the first and second payguide assemblies comprises a bulkhead plate and a fiber transfer spool connected to the bulkhead plate. The fiber transfer spool is configured for having a portion of the optical fiber to be used in forming the coil wound thereon. A dancer wheel is connected to the bulkhead plate and arranged such that optical fiber from the fiber transfer spool passes under the dancer wheel. A capstan roller is connected to the bulkhead plate and arranged such that optical fiber passes over the capstan roller. A fiber guide wheel is connected to the bulkhead plate and configured to direct the optical fiber to a location adjacent the spool for forming the coil. A dancer motor/encoder is connected to the dancer wheel for detecting when the dancer wheel deviates from a selected null position to indicate the tension in the fiber. A paymotor and brake apparatus is connected to the fiber transfer spool for adjusting the tension in the fiber in response to signals from the dancer motor/encoder.

The invention preferably further comprises a capstan encoder for measuring the length of optical fiber paid out to the spool and a pinch roller for compressing the fiber against the capstan roller to prevent the fiber from slipping over capstan roller as the fiber is paid out to the spool.

The invention also preferably comprises further comprises an epoxy applicator assembly configured to be demountably coupled to the robotic manipulator assembly for movement to a location adjacent the coil for applying epoxy to the coil.

The present invention provides apparatus and methods for winding fiber optic coils having quadrupole symmetry. The invention provides six degrees of motion control of a robotic fiber transfer and sensor spool manipulator capable of fabricating quadrupole wound coils. These coils are suitable for use in constructing a fiber optic rotation sensor. The present invention avoids the use of slip rings, which are used in previous coil winder designs. The coil winder according to the present invention is capable of dynamically and accurately controlling all critical geometric and winding parameters. The coil winder according to the present invention has the added advantage of eliminating the need for operator intervention during the winding process. Wind time is reduced from three days, which is required for manually winding a fiber optic rotation sensor coil to about one hour while at the same time improving the quality of the coils.

An appreciation of the objectives of the present invention and a more complete understanding of its structure and method of operation may be had by studying the following description of the preferred embodiment and by referring to the accompanying drawings.

BRIEF DESCRIPTION OF THE DRAWINGS

FIG. 4 is a front elevation view of the payguide assembly of FIG. 3;

FIG. 5 is a top plan view of the payguide assembly of FIGS. 3 and 4;

DETAILED DESCRIPTION OF THE INVENTION

Basic Structure

Figure 1:
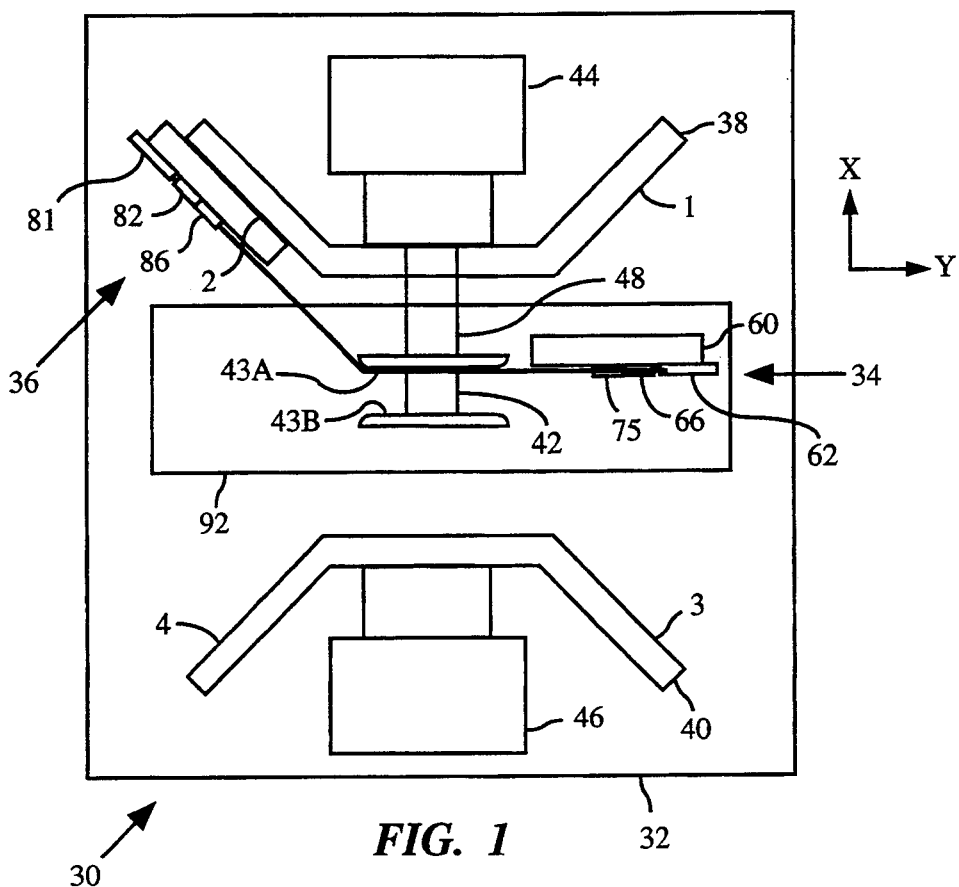
FIG. 1 is a top plan view illustrating the basic structural components of a coil winder that embodies the principles of the present invention.
Figure 2:
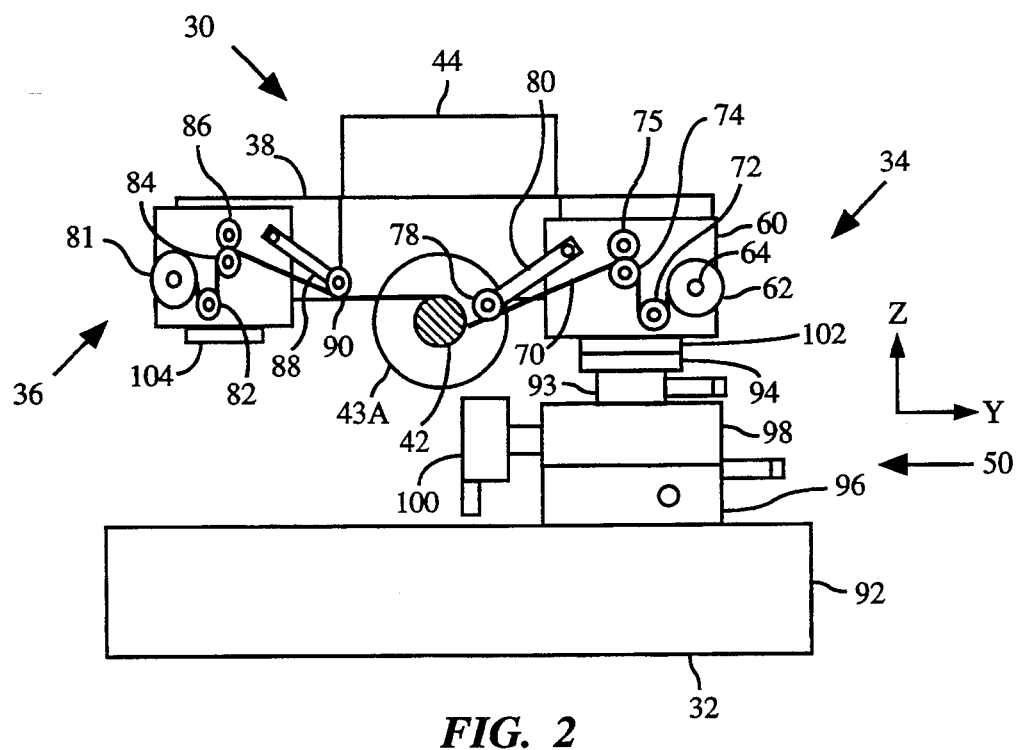
FIG. 2 is a partial cross-sectional view of the coil winder of FIG. 1.

FIGS. 1 and 2 illustrate the general structure of the coil winder 30 according to the present invention. The coil winder 30 is mounted on a stand assembly 32. The coil winder 30 includes a pair of fiber payguide assemblies 34 and 36, and a pair of payguide mounting bracket assemblies 38 and 40. The first payguide mounting bracket assembly 38 has a pair of payguide mounting stations 1 and 2. The second payguide mounting bracket assembly 40 has a pair of payguide mounting stations 3 and 4.

The coil winder 30 is designed to form a fiber optic coil having quadrupole symmetry on a spool 42. The spool 42 includes flanges 43A and 43B that define the ends of optical fiber coils formed on the spool 42.

The coil winder 30 further includes a pair of motors 44 and 46 for rotating the payguide mounting bracket assemblies 38 and 40, respectively. The motor 44 is connected to the spool 42 via a shaft 48 so that the motor 44 also rotates the spool 42 with the payguide mounting bracket assembly 38.

Referring to FIG. 2, the coil winder 30 further includes a robotic manipulator assembly 50 for moving the payguide assemblies 34 and 36 into selected positions during coil winding operations. The manipulator assembly 50 and the first and second payguide assemblies 34 and 36 include electrical and mechanical couplers so that the manipulator assembly 50 can mechanically attach itself to the payguide assemblies 34 and 36 and make appropriate electrical connections for supplying electrical power thereto. The robotic manipulator assembly 50 may include an Applied Robotics Iota robot or the equivalent. Such robots are commercially available and therefore are not described in detail herein.

Figure 3:
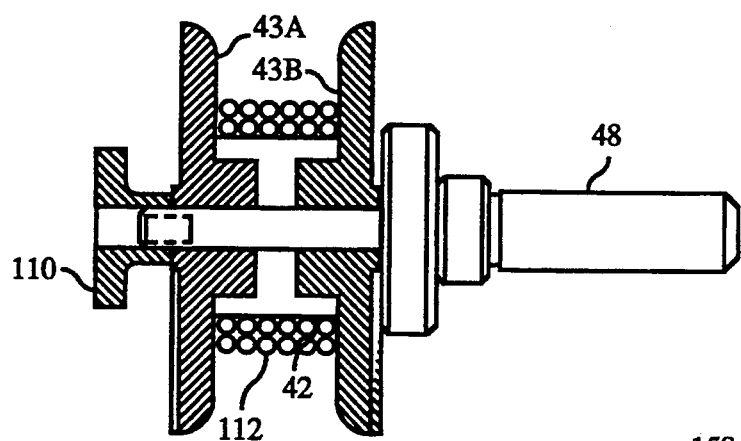
FIG. 3 is a cross-sectional view of a spool and flange assembly upon which a fiber optic coil may be wound using the coil winder according to the present invention.

The first and second payguide assemblies 34 and 36 have essentially identical structures. Therefore, only the first payguide assembly 34 is described in detail. Referring to FIGS. 1–3, the first payguide assembly 34 includes a payguide bulkhead plate 60 upon which other components of the first payguide assembly 34 are mounted.

Referring to FIGS. 1–2, a first fiber transfer spool 62 is rotatably mounted to the first payguide bulkhead plate 60. The motor is used to wind optical fiber from a supply spool (not shown) Onto the fiber transfer spool before winding an optical fiber coil. In coil winding operations, optical fiber is transferred from the first fiber transfer spool 62 to the spool 42.

Referring to FIGS. 2 and 4, an optical fiber 70 from the first fiber transfer spool 62 passes over a first dancer roller 72. The optical fiber 70 then passes over a first capstan roller 74, which is also rotatably mounted to the first payguide bulkhead plate 60. A first pinch roller 75 is rotatably mounted on the first payguide bulkhead plate 60 just above the first capstan roller 74. The first pinch roller 76 exerts a downward force on the optical fiber 70 to prevent it from slipping over the first capstan roller 74.

After passing over the first capstan roller 74, the optical fiber 70 then passes over a first fiber guide wheel 78 that is connected to the payguide bulkhead plate 60 by a first fiber guide arm 80. The first fiber guide wheel directs the optical fiber 70 to the spool 42 and applies the optical fiber 70 to the spool 42 to form a coil of optical fiber thereon.

The second payguide assembly 36 includes a second fiber transfer spool 81, a second dancer roller 82, a second capstan roller 84, a second pinch roller 86, a second fiber guide wheel 88, and a second fiber guide arm 90 that are essentially identical to the first payguide assembly 34. As shown in FIG. 1, when the first payguide assembly 34 is adjacent the spool 42, the second payguide assembly 36 is spaced apart form the spool 42 and attached to the first payguide mounting bracket assembly 38.

Referring to FIGS. 1 and 2, the robotic manipulator assembly 50 is mounted on a stand 92. The robotic manipulator assembly 50 includes a robotic tool changer 94 that is connected to an R-axis manipulator 93 which is in turn mounted to x, y, and z-axis stages 96, 98, and 100, respectively. The robotic manipulator assembly 50 also includes a robotic tool changer 94 that is connected to the y-axis stage 98. The robotic tool changer 94 is the companion to a robotic coupler 102 that is fixed to the underside of the payguide bulkhead plate 60. The robotic tool changer 94 and the robotic coupler 102 are connected together when the first payguide assembly 34 is to be mounted to the robotic manipulator assembly 50. A similar robotic coupler 104 is fixed to the underside of the second payguide assembly 36 and is used when the second payguide assembly 36 is connected to the robotic manipulator assembly 50. Only one of the payguide assemblies 34 and 36 is connected to the robot assembly at a time.

Basic Method of Operation

The coil winding operation starts with the step of winding all the fiber to be used in forming the fiber optic coil onto the first fiber transfer spool 62. This step is referred to as the "full transfer." Half of the fiber is then transferred to the second fiber transfer spool 81. This step is the "half transfer." Both the full and half transfer steps are done under the control of the a computer under the control of appropriate software. The appendix attached hereto contains a source code listing for computer software that is included in a preferred embodiment of the invention. The robotic manipulator assembly 50 then moves the first payguide assembly 34 to a location as shown in FIG. 1 so that the first fiber guide wheel 78 is adjacent the spool 42 and the flange 43A. The motor 44 then rotates the spool 42, the first payguide mounting bracket assembly 38 and the second payguide assembly 36, which is attached to the first payguide mounting bracket assembly 38 at station 2. The x-axis manipulator 96 translates the first payguide assembly 34 along the x-axis in conjunction with the rotation of the motor 44 and spool 42 to form the first layer of optical fiber on the spool 42. Rotation of the second payguide assembly 36 with the spool causes there to be no net payout of optical fiber 70 from the second payguide assembly 36 to the spool 42 while the first layer is being formed.

The robotic manipulator assembly 50 then parks the first payguide assembly 34 at the station 3 of the second payguide mounting bracket assembly 40. After parking the first payguide assembly 34, the robotic manipulator assembly 50 moves to the vicinity of station 2 of the first payguide mounting bracket assembly 38 to pick up the second payguide assembly 36. The second payguide assembly 36 is then moved so that the second fiber guide arm 90 is adjacent the spool 42 and the flange 43B. The motors 44 and 46 then rotate in conjunction with the spool 42 while the second payguide assembly 36 is translated along the x-axis to form a second layer of the fiber optic coil on the spool 42. After the second layer of optical fiber is formed, the direction of translation of the second payguide assembly 36 reverses so that a third layer of the fiber optic coil is formed on the spool 42. The motor 46 rotates the first payguide assembly 34 at the same rate and in the same direction as the spool 42 rotates. Therefore, there is no net payout of optical fiber from the first payguide assembly 34 to the spool 42 while the second and third layers of the fiber optic coil are being formed.

The second payguide assembly 36 is then parked at station 2 of the first payguide mounting bracket assembly 38. The robotic manipulator assembly 50 then picks up the first payguide assembly 34 from station 3 and uses it to form the fourth and fifth layers while the second payguide assembly 36 is being rotated with the spool 42. The steps described above are then repeated so that two layers of the optical fiber coil are formed from each of the first payguide assembly 34 and second payguide assembly 36 in alternating succession until the desired number of layers is formed.

As described subsequently, an important feature of the invention is because access to the spool is unimpeded after each layer is wound, epoxy or other suitable adhesive may be applied to optical fiber coil as each layer is formed. Referring to FIG. 3, a nut 110 may be removed from and end of the spool 42 so that the flange 43A may then be detached from the spool 42. A fiber optic coil 112 that has been formed on the spool 42 between the flanges 43A and 43B may then be slid off the spool 42 after the epoxy has cured. The resulting fiber optic coil 112 is then self-supporting without requiring the spool 42 or the flanges 43A and 43B to keep the coil in its desired configuration.

Preferred Embodiment of the Invention

FIGS. 4–13 show a preferred embodiment of the present invention. Referring in particular to FIGS. 4 and 5, a payguide assembly 120 includes a payguide bulkhead plate 122. A fiber transfer spool 121 is mounted to the payguide bulkhead plate 122. Optical fiber 123 is fed from the fiber transfer spool 121 to a dancer assembly 124. The dancer assembly 124 includes a dancer roller 126 that is rotatably mounted on a dancer roller shaft 128. The dancer roller shaft 128 is connected to a first end 130 of a dancer arm 132. The dancer arm 132 is pivotally mounted to the payguide bulkhead plate 122 by a shaft 134. A counterweight 136 is mounted to the dancer arm 132 near an end 138 thereof.

After passing under the dancer roller 126 as shown in FIG. 4, the optical fiber 123 passes over a precision capstan roller 140 that is rotatably mounted to the payguide bulkhead plate 122 to the left above the dancer roller 126. A pinch roller 142 is mounted to the payguide bulkhead plate 122 and arranged to exert a compressive force on the optical fiber 123 to prevent the optical fiber 123 from slipping as it passes over the precision capstan roller 140. The pinch roller 142 is mounted to a pinch roller arm 144 that has a first end 146 rotatably mounted to the payguide bulkhead plate 122. A pinch roller spring 148 is mounted between the payguide bulkhead plate 122 and the second end 150 of the pinch roller arm 144. The pinch roller spring 148 is in compression so that it urges the pinch roller 142 toward the precision capstan roller 140.

After passing over the precision capstan roller 140, the optical fiber 123 then passes to a fiber guide wheel 154. The fiber guide wheel 154 is rotatably mounted to a first end 156 of a fiber guide wheel arm 158. A second end 160 of the fiber guide wheel arm 158 is rotatably mounted to the payguide bulkhead plate 122. The optical fiber 123 then passes from the fiber guide wheel 154 to the spool 42 as described previously with reference to FIGS. 1 and 2.

Figure 9:
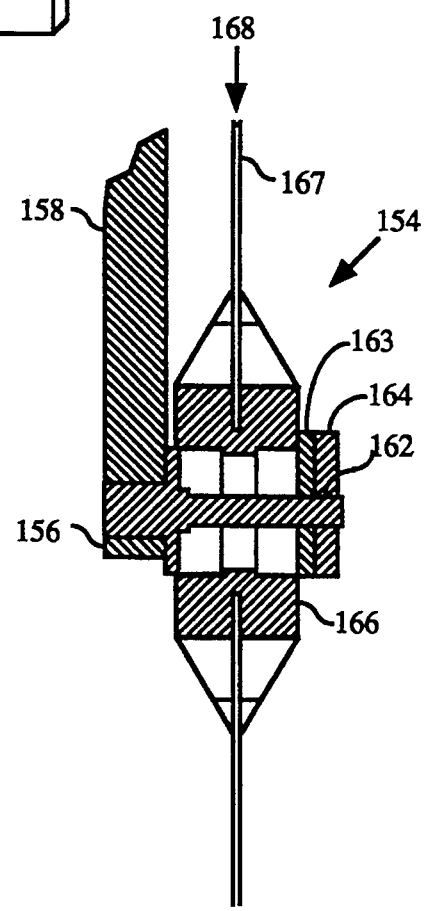
FIG. 9 is a cross-sectional view of a fiber guide wheel included in the payguide assembly of FIGS. 3–7.

Referring to FIG. 9, the fiber guide wheel 154 is shown in greater detail. A shaft 162 is mounted in the end 156 of the fiber guide wheel arm 158. A washer 163 and a nut 164 retain the fiber guide wheel 154 upon the shaft 162. The fiber guide wheel 154 has a central portion 166 and a thin outer portion 167. The central portion 166 is formed to provide stability. The thin outer portion 167 is formed to fit between the flanges 43a and 43B and to lay the optical fiber on the spool 42 so that the ends of the coil are near the flanges 43a and 43B. The thin outer portion has a peripheral groove 168 in which the optical fiber fits as it passes over the fiber guide wheel 154.

Figure 10:
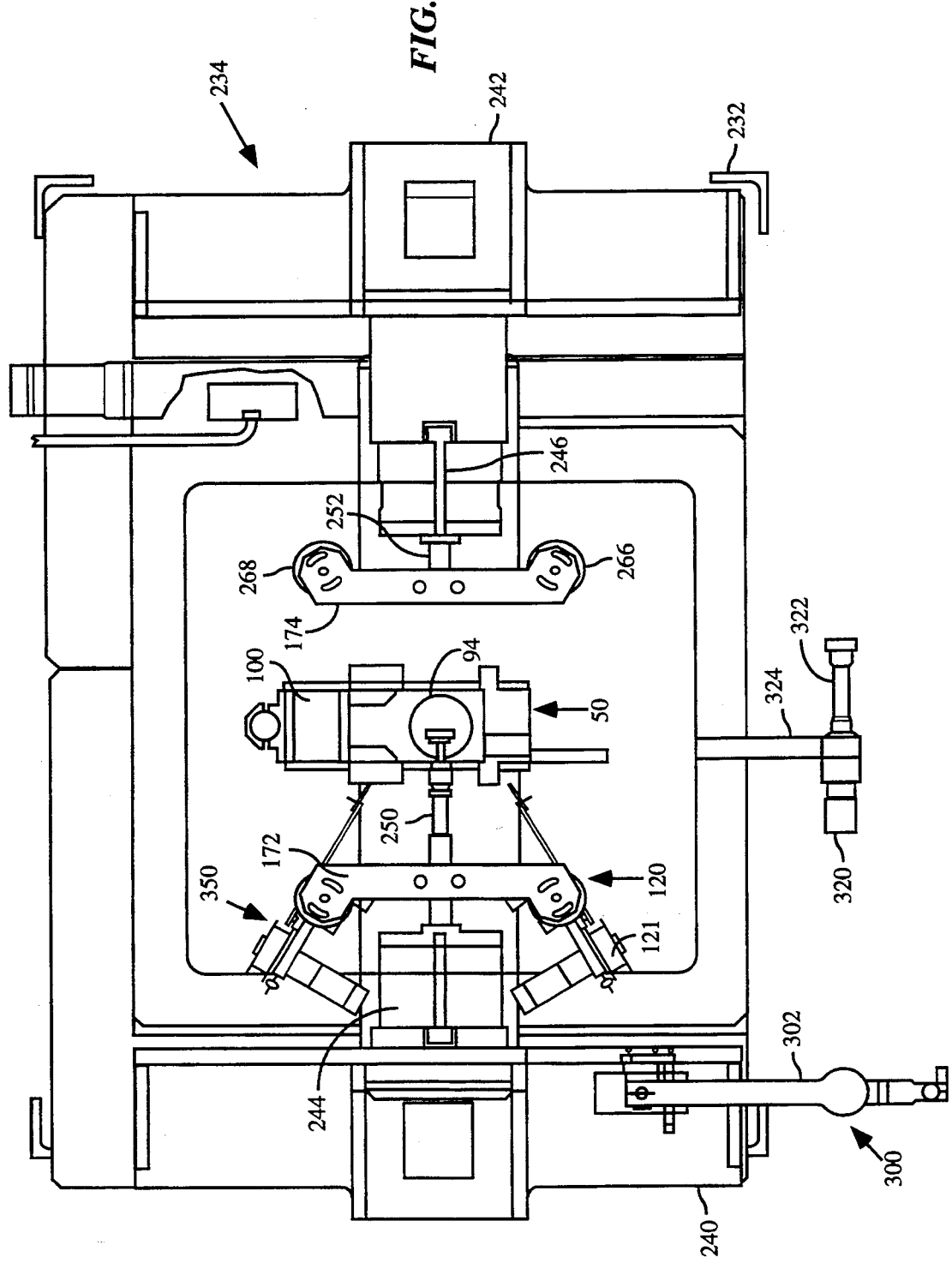
FIG. 10 is a top plan view of a coil winder according to a preferred embodiment the present invention.
Figure 11:
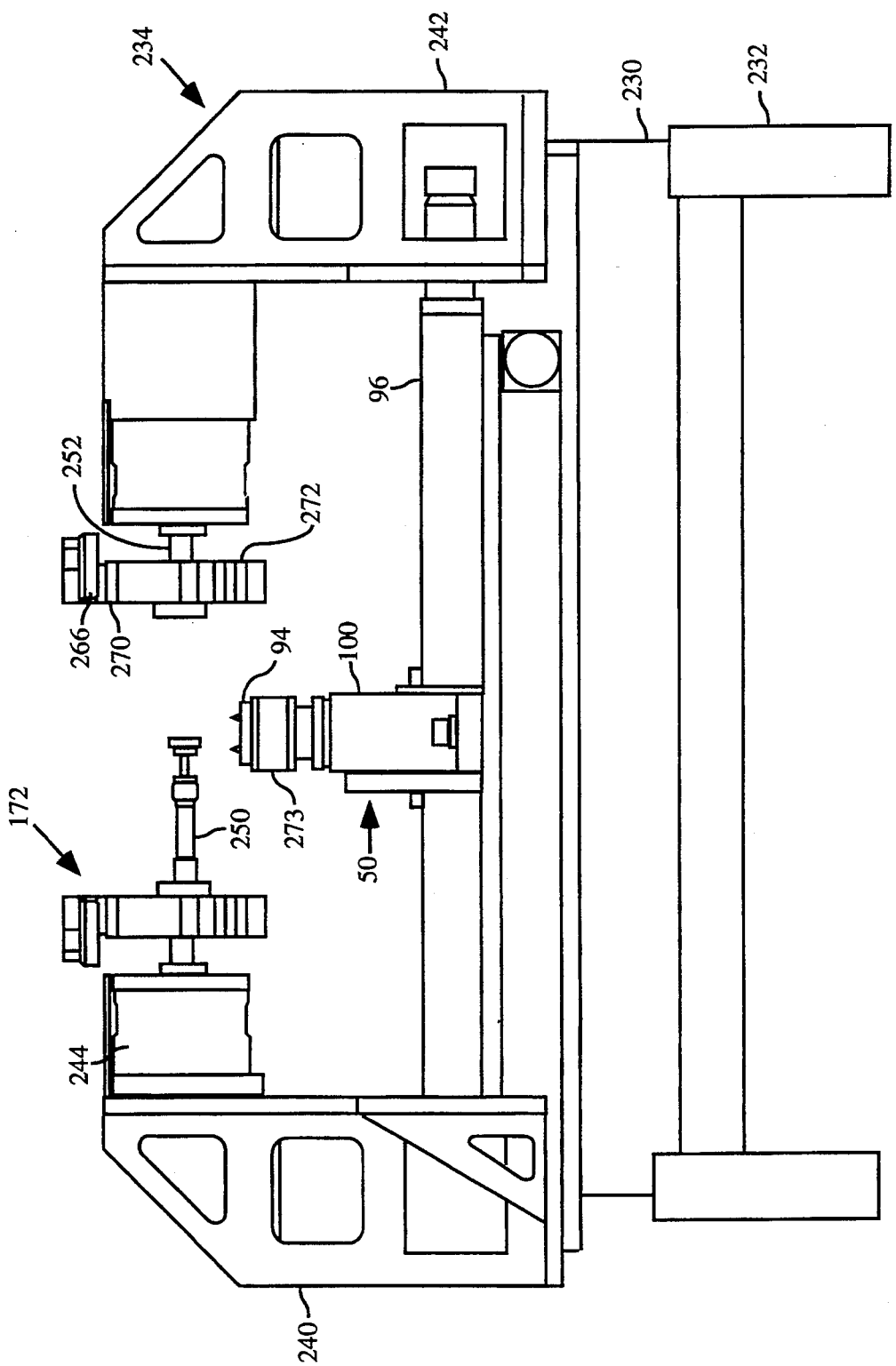
FIG. 11 is a front elevation view of the coil winder of FIG. 10.

Referring to FIGS. 4–7, the payguide assembly 120 includes a first robotic coupler 170 that is used to attach the payguide assembly 120 to payguide mounting bracket assemblies 172 and 174, which are shown in FIGS. 10 and 11. The payguide assembly 120 also includes a second robotic coupler 176 that is used to connect the payguide assembly 120 to the robotic manipulator assembly 50. The second robotic coupler 176 includes both mechanical and electrical connectors for mechanically connecting the payguide assembly 120 to the robotic manipulator assembly 50 and for supplying electrical power thereto. The coil winder 30 according to the present invention thus avoids the use of slip rings, which are used in prior art coil winding apparatus to provide electrical power to spools and wheels used to wind fiber optic coils.

Referring to FIGS. 4–8, the payguide assembly 120 includes a paymotor 180 that is connected to the fiber transfer spool 121 via a shaft 182. A paymotor brake 183 is connected to the paymotor 180 to provide a braking force. A dancer motor/encoder 184 is mounted to the dancer via shaft 134. The paymotor 180 and the dancer motor/encoder 184 are connected to maintain a constant tension the optical fiber 123. The tension in the optical fiber 123 must be controlled to wind fiber optic coils that are suitable for fiber optic rotation sensor applications. If the tension is too low, the coils will not be secured to the spool. If the tension is too high, the coils will dig into layers previously applied to the spool. Variations in fiber tension also cause variations in the refractive index of the fiber, which causes errors in a fiber optic rotation sensor. The paymotor 180 and the dancer motor/encoder 184 keep the dancer in a null position as the spool 42 rotates to pay out fiber from the fiber transfer spool 121 to the spool 42. The dancer roller 126 and the counterweight 136 are adjusted to provide a predetermined force on the optical fiber 123. In a preferred embodiment, the downward force on the dancer roller 126 is the weight of a 10 gram mass when the dancer roller 126 is in the null position shown in FIG. 4 with the dancer arm 132 being essentially horizontal. This force is evenly divided between the portion of the optical fiber 123 between the dancer roller 126 and the fiber transfer spool 121 and the portion of the optical fiber 123 between the dancer roller 126 and the precision capstan roller 140.

The dancer motor/encoder 184 detects deviations of the dancer roller 126 from its null position and sends a signal to the paymotor 180 and paymotor brake 183 to either increase or reduce the tension on the optical fiber 123. If the tension in the optical fiber 123 is to be increased, the paymotor brake 183 is activated to apply a retarding torque to the shaft 182. If the tension in the optical fiber 123 is to be decreased, then the paymotor 180 is activated to rotate the fiber transfer spool 121 counterclockwise as viewed in FIG. 4.

Figure 8:
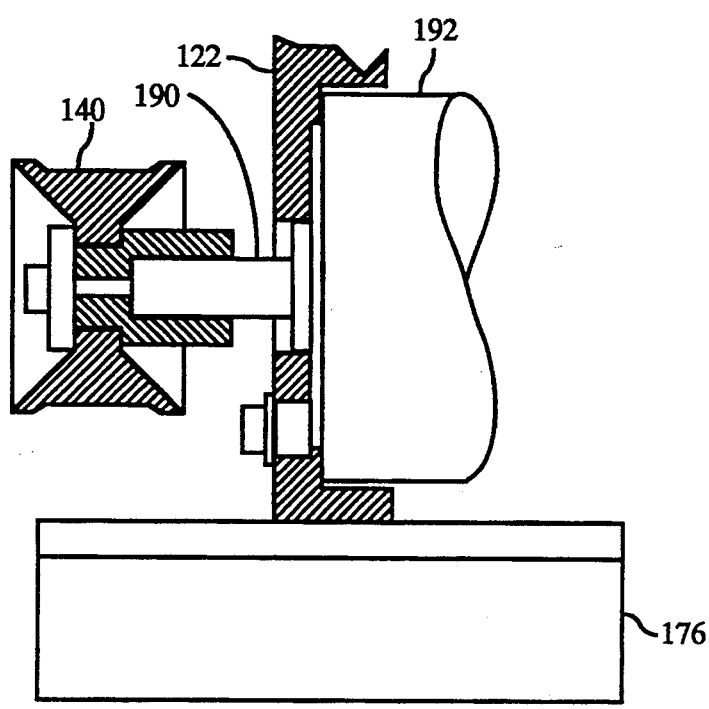
FIG. 8 is a cross-sectional view of a capstan wheel assembly included in the payguide assembly of FIGS. 3–7.
Figure 6:
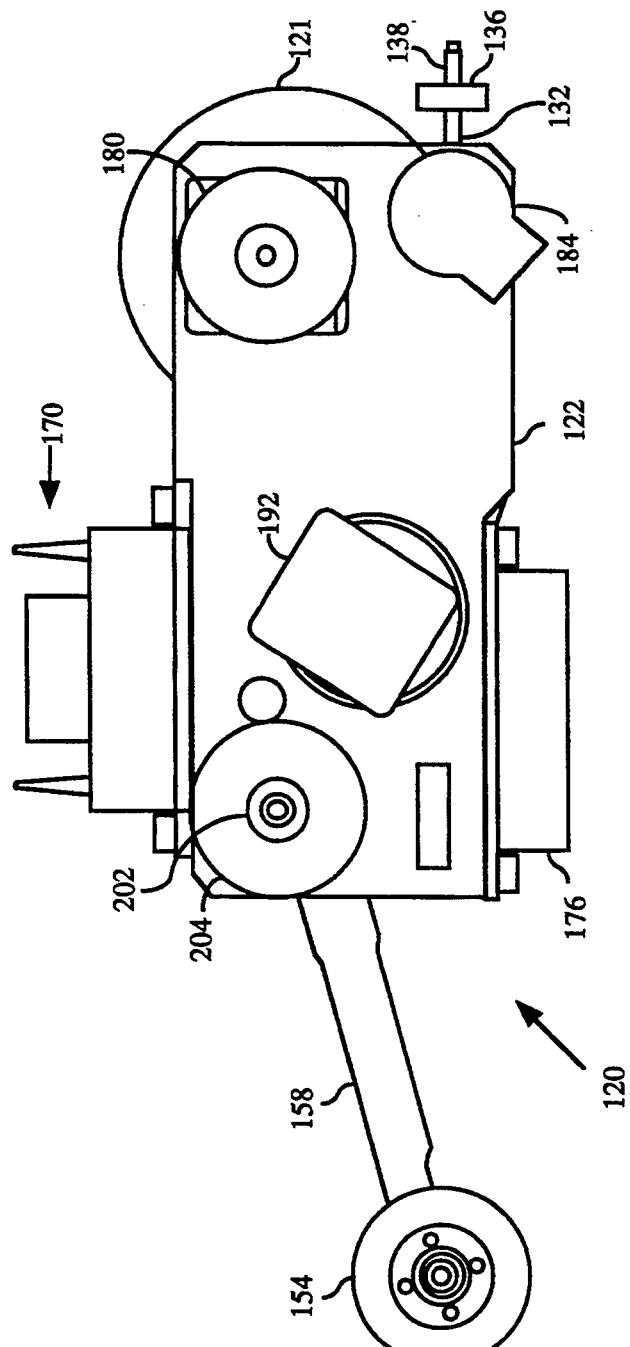
FIG. 6 is a rear elevation view of the payguide assembly of FIGS. 3–5.

As shown in FIG. 8, the precision capstan roller 140 is mounted on a capstan shaft 190 that extends through the payguide bulkhead plate 122. A capstan encoder 192 is mounted to the shaft 190 and is configured to measure the length of the optical fiber 123 paid out to the spool 42. The precision encoder wheel allows precise measurement of all clockwise and counterclockwise turns using the formula $L = \pi dN$, where d is the coil diameter and n is the number of turns.

Figure 7:
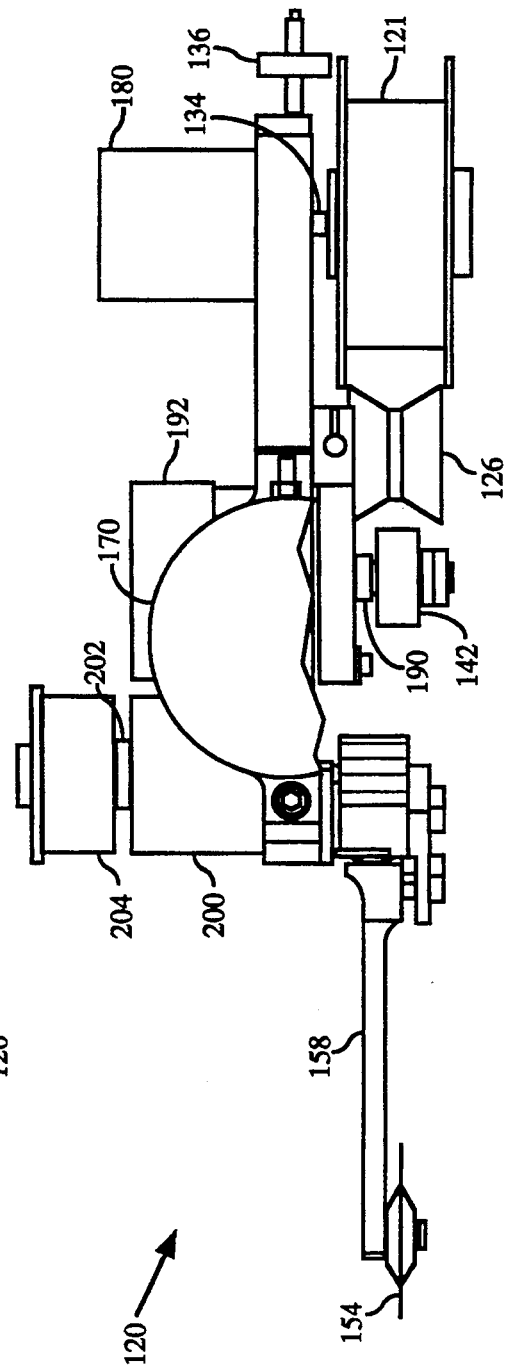
FIG. 7 is a bottom plan view of the payguide assembly of FIG. 3–6; .

The payguide assembly 120 further includes a fiber guide arm motor 200 best shown in FIGS. 5 and 7. The fiber guide arm motor 200 is mounted to the payguide bulkhead plate 122 via a shaft 202. A fiber guide arm brake 204 is also mounted to shaft 202. The fiber guide arm motor 200 is used to place the fiber guide wheel arm 158 and fiber guide wheel 154 in position for winding the fiber optic coil and for retracting the fiber guide wheel 154 from the vicinity of the flanges 43A and 43B when the payguide assembly 120 has completed forming its designated steps in the coil winding operation.

The fiber guide arm brake 204 is used to retain the fiber guide wheel arm 158 in position during coil winding with he payguide assembly 120 or while the payguide assembly 120 is in its storage position on one of the mounting bracket assemblies 172 and 174.

The fiber guide wheel arm 158 also includes a yaw adjustment mechanism 210. As used herein the yaw adjustment means adjusting the angle of the fiber guide wheel arm 158 in the plane of the paper of FIG. 7. A bolt 212 may be tightened or loosened slightly to adjust the angle of the fiber guide wheel arm 158 and the fiber guide wheel 154 so that the optical fiber 123 feeds properly from the payguide assembly 120 to the spool 42. In particular, it may be necessary to adjust the angle of the fiber guide wheel 154 to prevent the optical fiber 123 from jumping out of the groove 168 as the coil is being wound.

Referring to FIGS. 10 and 11, the coil winder according to the present invention preferably rests upon a granite block 230. A support structure 232 holds the granite block 230 a desired distance above a floor (not shown) or the like. A coil winder stand assembly 234 rests upon the granite table 230.

The coil winder stand assembly 234 includes a pair of motor mount assemblies 240 and 242 are mounted to opposite ends of the stand assembly 234. A motor 244 is mounted to the motor mount assembly 240, and a motor 246 is mounted to the motor mount assembly 242. The motor 244 is configured to drive a spindle 250, and the motor 246 is configured to drive a spindle 252.

Figure 13:
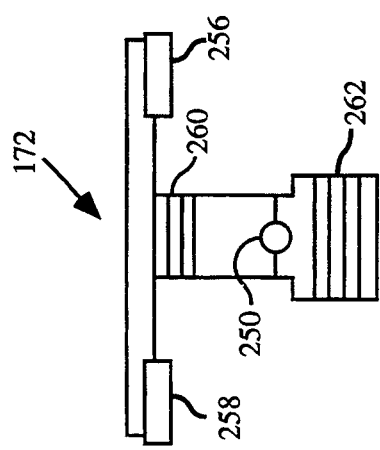
FIG. 13 is an elevation view of a payguide bracket assembly included in the coil winder of FIGS. 11 and 12.

The mounting bracket assembly 172 is fixed to the spindle 250 to be rotational therewith when the motor 244 is on. Referring to FIG. 13, the mounting bracket assembly 172 may include a pair of robotic couplers 256 and 258, one or more spacers 260 and a counterweight 262. The mounting bracket assembly 174 is essentially identical to the mounting bracket assembly 172 and includes a pair of robotic couplers 266 and 268, spacers 270 and a counterweight 272. The mounting bracket assembly 174 is rotatable with the spindle 252 when the motor 246 is on the stand assembly 234.

The robotic manipulator assembly 50 is shown located mounted on the stand 234 between the mounting bracket assembly 172 and the mounting bracket assembly 174. The robotic tool changer 94 is mounted to a robotic accomodator 273, which is mounted to the z-axis assembly 100. The z-axis assembly 100 is shown in FIG. 11 connected to the x-axis assembly 96.

Figure 12:
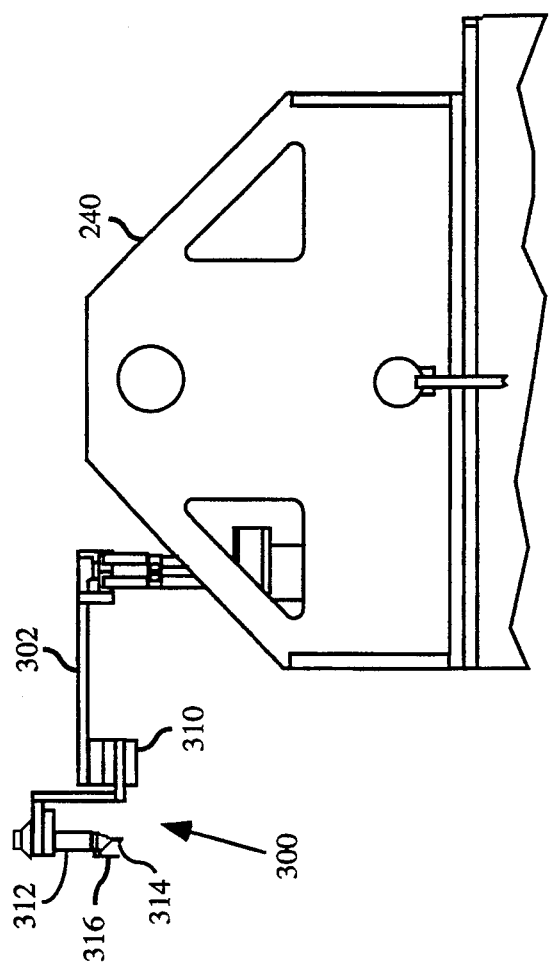
FIG. 12 is a left end elevation view of the coil winder of FIGS. 10 and 11.

Referring to FIGS. 10 and 12, the coil winder 30 includes a pneumatic epoxy applicator assembly 300. A rotator arm 302 connects the pneumatic epoxy applicator assembly 300 to the motor mount 240. The pneumatic epoxy applicator assembly 300 includes a robotic coupler 310 that the robotic manipulator assembly 50 uses to position the pneumatic epoxy applicator assembly 300 for applying epoxy to each layer of the coil after it is formed. The pneumatic epoxy applicator assembly 300 includes a syringe 312, a needle 314 and a trowel 316. Under the control of the computer and software, epoxy is force out of the syringe 312, through the needle 314 onto the fiber coil. The robotic manipulator assembly 50 moves the pneumatic epoxy applicator assembly 300 along the length of the spool 42 as the spool 42 rotates so that epoxy is applied to the entire coil. The epoxy robot is a two axis gantry mechanism. The epoxy robot shuttles the epoxy applicator syringe 312 to a location above the spool 42 and down between the flanges 43A and 43B. The first layer of optical fiber on the spool is then tacked with a suitable epoxy, The epoxy is then preferably cured with ultraviolet radiation before the second layer of optical fiber is wound onto the spool.

The payguide assemblies are mounted to one of the mounting bracket assemblies 172, 174 while the epoxy is being applied to the coil.

Referring to FIG. 10, a bulk pay spindle 322 is mounted to the stand 234 via a support bracket 324. A bulk paymotor 320 drives the bulk pay spindle to wind a predetermined amount of optical fiber thereon. The optical fiber is then transferred to the fiber transfer spool 121. Half of the fiber is then transferred to a similar fiber transfer spool included in a second payguide assembly 350 shown in FIG. 10 before the coil begins to be wound.

The invention has several advantages over the prior art. The fiber guide allows precision control of fiber application within the flanges of the sensor spool due to narrow (>0.030") width and long length )>1.00"). Because the payguide assemblies 120 and 350 are removed from the region of the flanges 43A and 43B, epoxy can be applied to each layer of the coil. The mechanisms of the payguide assemblies 120 and 350 allow precise control of the length and tension of the fiber paid out to the spool 42. The invention requires much less operator involvement than is possible with previous coil winding machines.

Description of the Software and Coil Winding Procedure

The flow charts of FIGS. 14–19 illustrate the sequence of operator steps and computer and robot operations to wind a coil. In the flow charts reference is made to the source code, which is attached to this application as an appendix. For example, the winder main menu block of FIG. 14 contains the designation "SRC 243" to indicate the location of the winder main menu in the source code.

Figure 14:
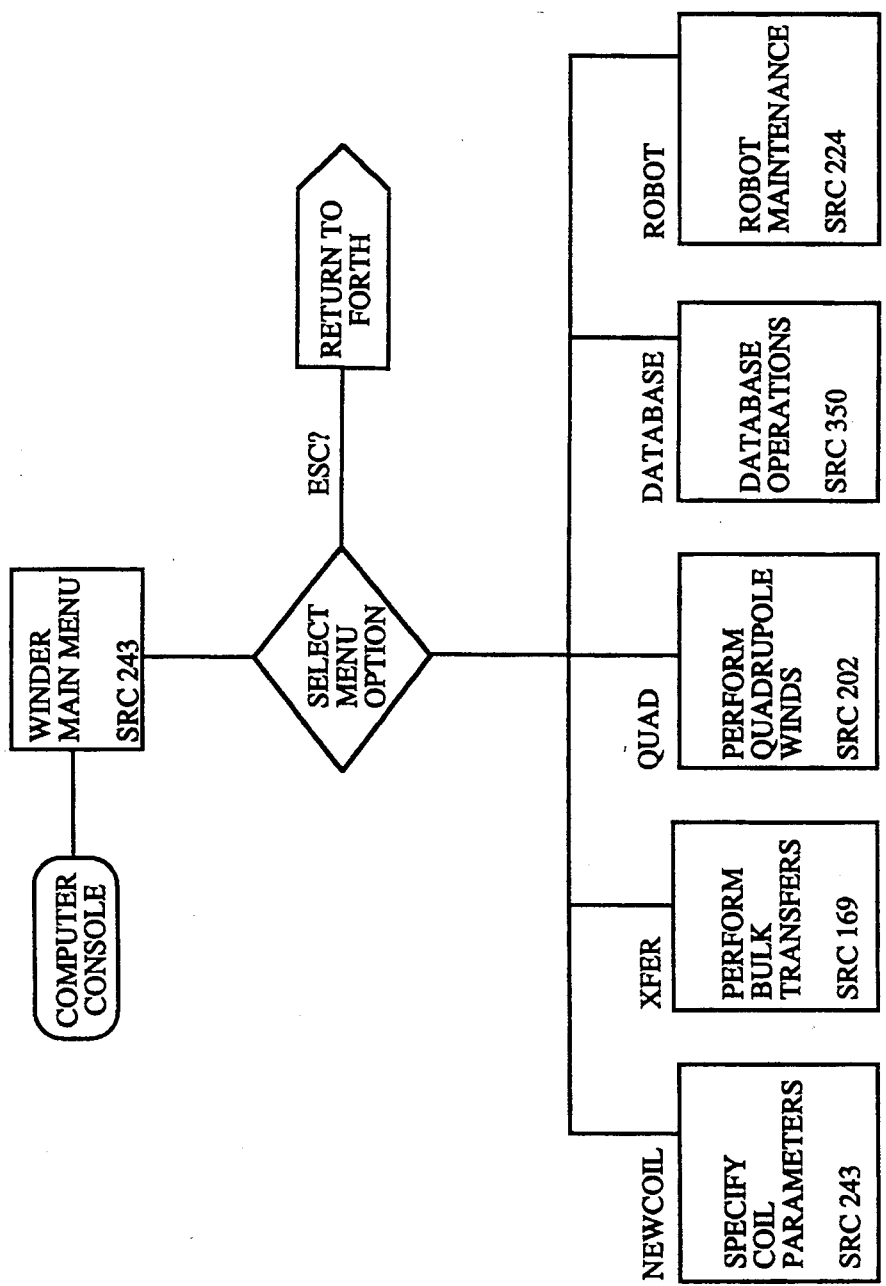
Figure 16:
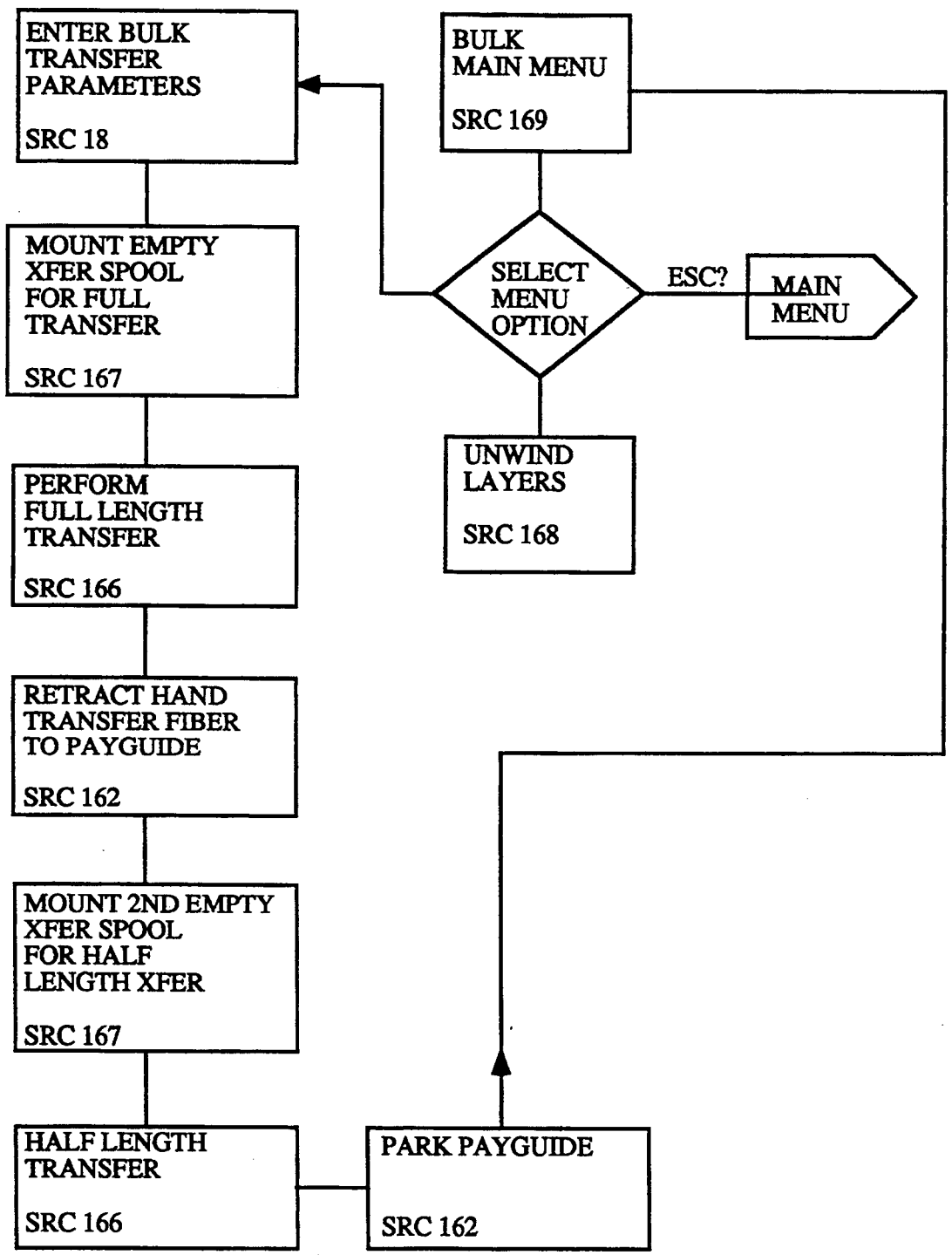
Figure 17:
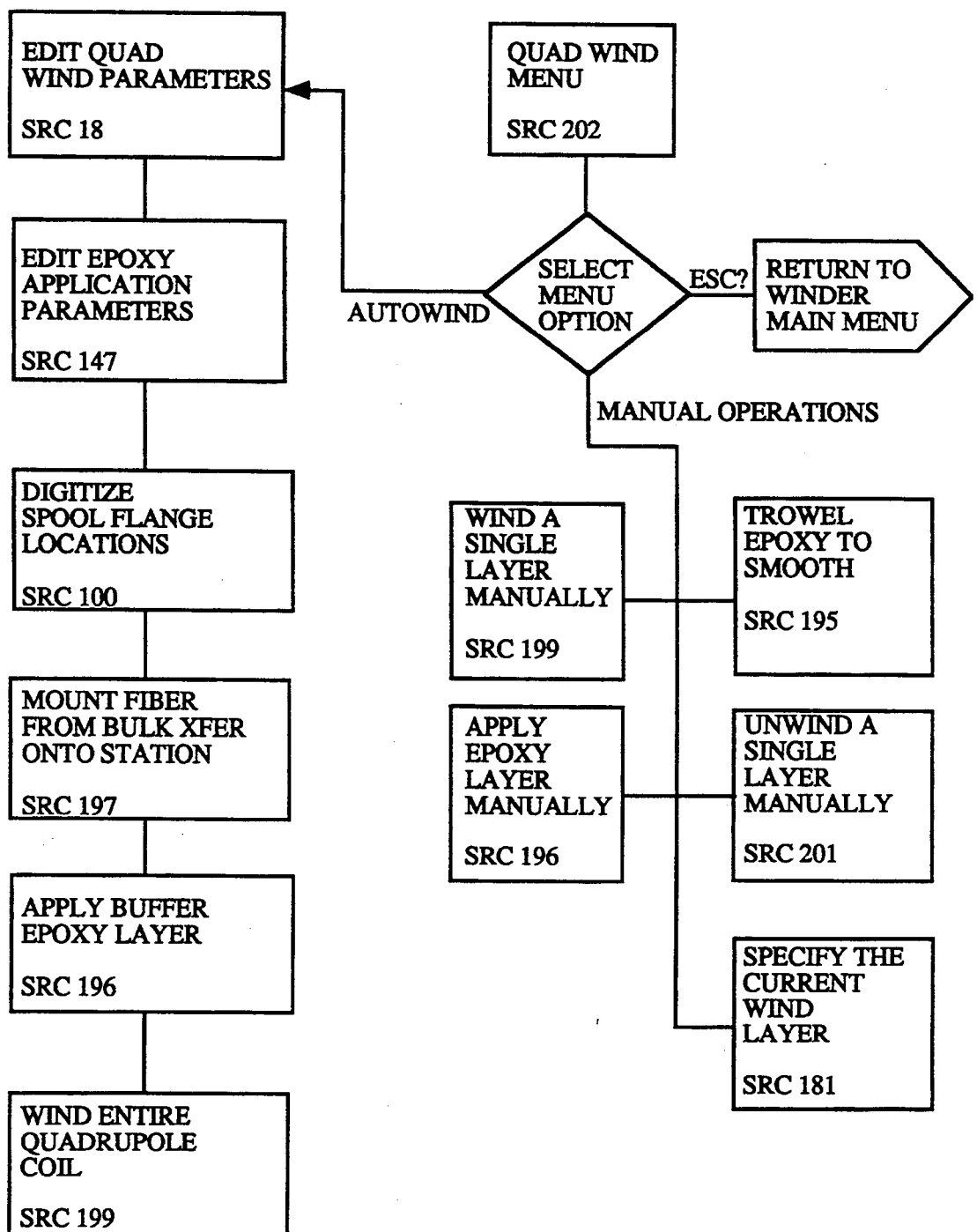
Figure 18:
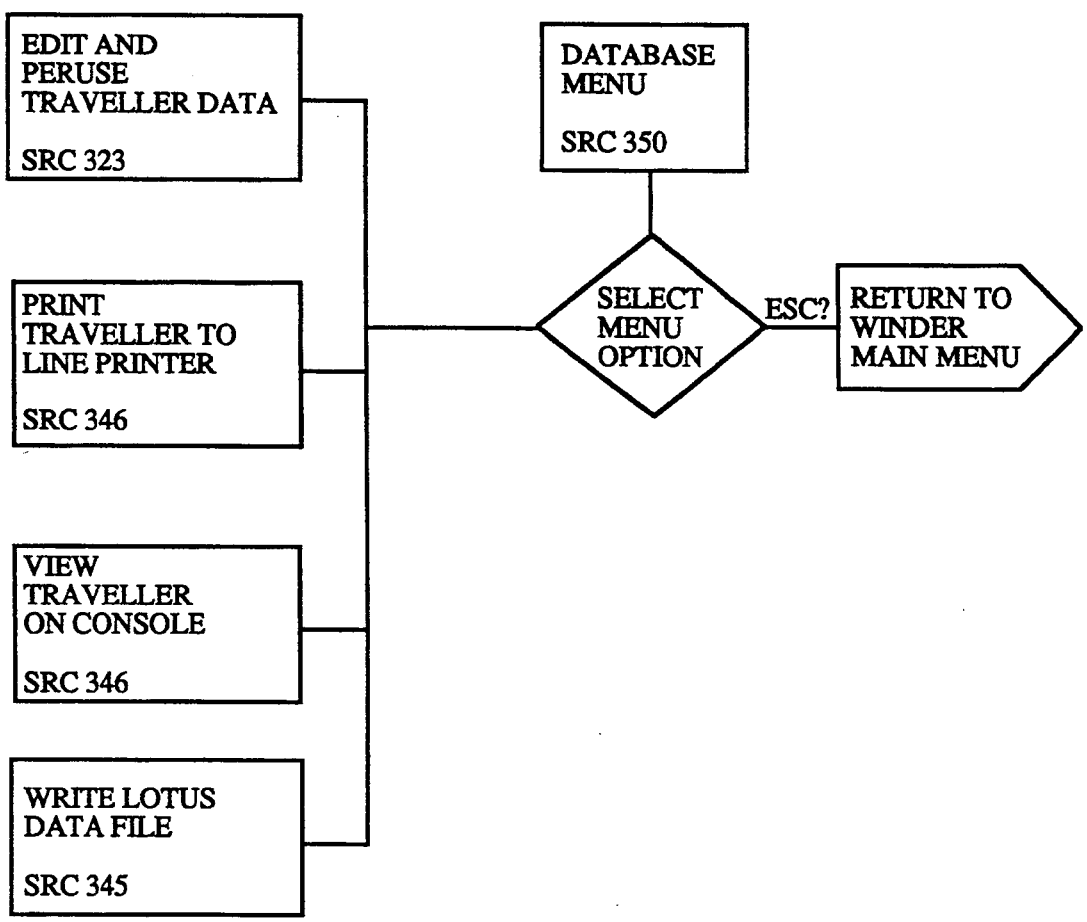
Figure 19:
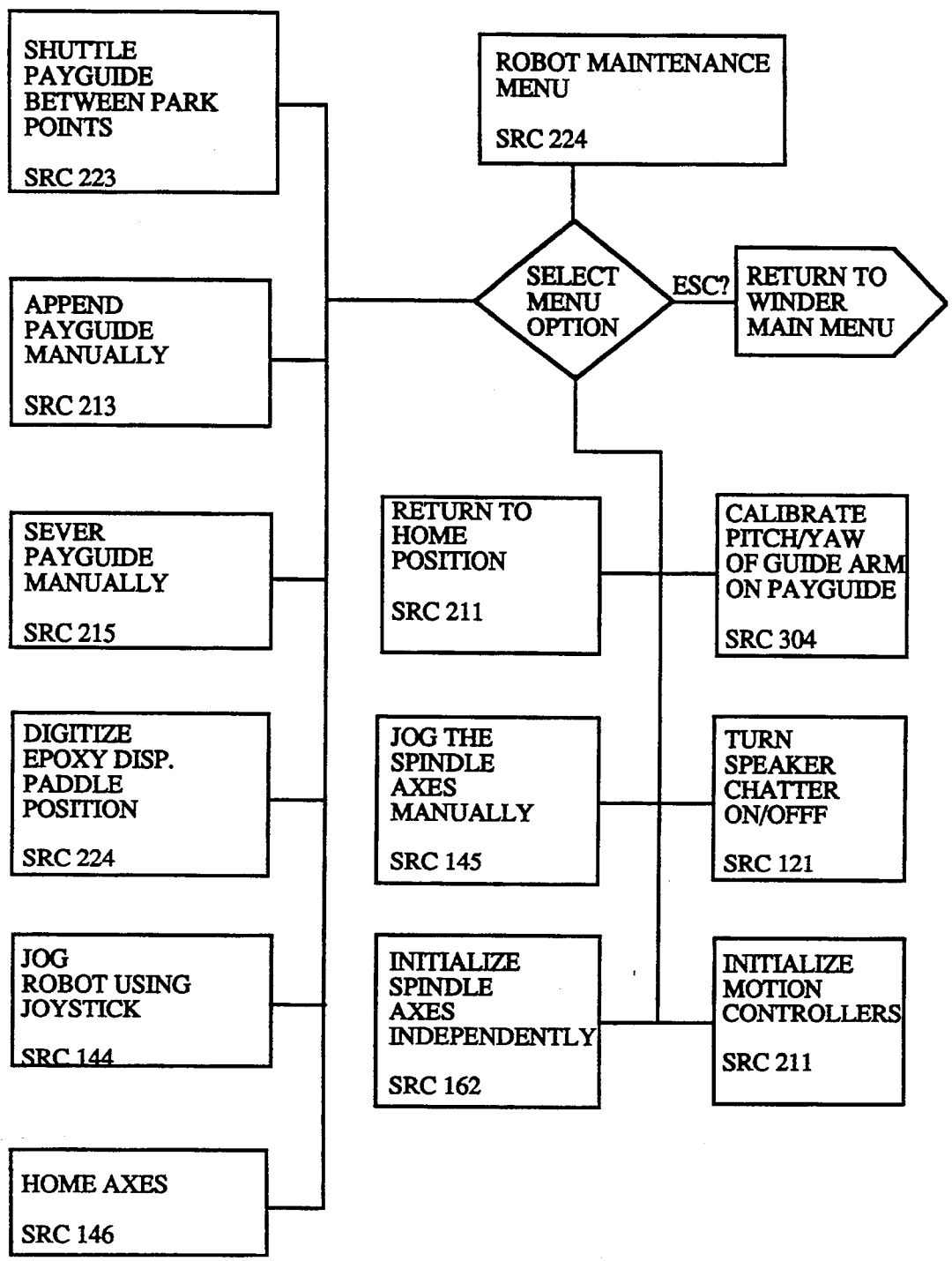

Referring to FIG. 14, to make a new coil the operator selects START NEW COIL from a menu on the computer monitor. The menu also includes BULK TRANSFER, WIND COIL, DATA BASE and MAINTENANCE. After START NEW COIL is selected, a data screen appears. The operator enters data for the coil serial number, operator identification and fiber lot.

Figure 15:
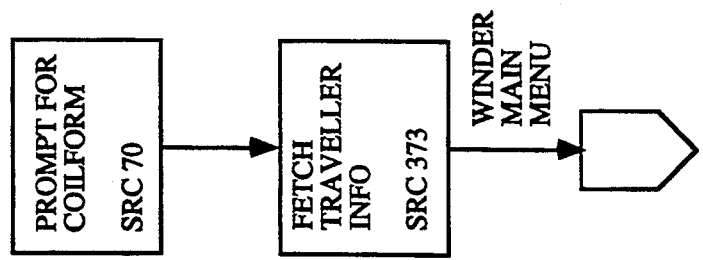
FIGS. 14–19 are a flowcharts of software used to control the coil winder according to the present invention.

The operator selects BULK TRANSFER from the coil wind menu. Referring to FIG. 15, the operator enters the bulk transfer parameters for the length of fiber to be used in making a new coil. A typical optical fiber coil for use in a fiber optic rotation sensor has 200 meters of optical fiber wound in 40 layers of 58 turns each at a tension of 3.00 grams. In a preferred embodiment, the resulting coil has an outside diameter of about 32 millimeters. In a typical bulk transfer operation, 215.00 meters of optical fiber are wound on the first fiber transfer spool by making 11 layers of 106 turns each at a tension of 10 grams.

The operator selects two clean fiber transfer spools and mounts them to the bulk transfer spool 322. The full length of the fiber to be used is then bulk transferred to the fiber transfer spool 322. The fiber transfer spool 121 is then mounted to the first fiber payguide assembly 503. A similar empty fiber transfer spool is then mounted to the second fiber payguide assembly 350. Half of the length of the optical fiber to be used in making the coil is then transferred from the first fiber transfer spool 121 to the second fiber transfer spool. The payguide assemblies 120 and 350 are then attached to the payguide holding assembly 172.

The operator insures that the data in the coil parameter table is correct for a quadrupole wind and then presses the ESC key on the computer keyboard.

The operator next selects the epoxy parameters for the coil. A minimum of 6 ml of epoxy is put into the 10 ml epoxy cylinder. The epoxy cylinder is placed into the epoxy holder and attaches the air line to the pneumatic epoxy applicator assembly 300.

The operator then selects LEARN SPOOL GEOMETRY, and the computer stores signals indicative of the flange locations and the diameter of the hub on which the coil is to be wound.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. Apparatus for forming a fiber optic coil, comprising:
   a support stand;
   a payguide mounting bracket assembly connected to the support stand;
   a spool connected to the payguide mounting bracket assembly;
   a first motor connected to the payguide mounting bracket assembly and configured for rotating the payguide mounting bracket assembly and the spool;
   a first payguide assembly demountably coupled to the payguide mounting bracket assembly;
   a second payguide assembly demountably coupled to the payguide mounting bracket assembly;
   a robotic manipulator assembly configured to decouple a selected one of the first and second payguide assemblies from the payguide mounting bracket assembly and move the selected payguide assembly to a location adjacent the spool such that a layer of optical fiber is paid out to the spool from the selected payguide assembly as the spool and payguide mounting bracket assembly rotate relative to the selected payguide assembly.

2. The apparatus of claim 1 wherein each of the first and second payguide assemblies comprises:
   a bulkhead plate;
   a fiber transfer spool connected to the bulkhead plate and configured for having a portion of the optical fiber to be used in forming a coil wound thereon;
   a dancer wheel connected to the bulkhead plate and arranged such that optical fiber from the fiber transfer spool passes under the dancer wheel;
   a capstan roller connected to the bulkhead plate and arranged such that optical fiber passes over the capstan roller;
   a fiber guide wheel connected to the bulkhead plate and configured to direct the optical fiber to a location adjacent the spool for forming the coil;
   a dancer motor/encoder connected to the dancer wheel for detecting when the dancer wheel deviates from a selected null position to indicate the tension in the fiber;

a paymotor and brake apparatus connected to the fiber transfer spool for adjusting the tension in the fiber in response to signals from the dancer motor-/encoder.

3. The apparatus of claim 2, further comprising a capstan encoder for measuring a length of optical fiber paid out to the spool.

4. The apparatus of claim 3, further including a pinch roller for compressing the fiber against the capstan roller to prevent the fiber from slipping over capstan roller as the fiber is paid out to the spool.

5. The apparatus of claim 1, further comprising an epoxy applicator assembly configured to be demountably coupled to the robotic manipulator assembly for movement to a location adjacent the coil for applying epoxy to the coil.

* * * * *